United States Patent [19]

Sasano et al.

[11] Patent Number: 4,690,020

[45] Date of Patent: Sep. 1, 1987

[54] APPARATUS FOR WORKING PERIPHERAL WALL OF HEMISPHERICAL SHELL

[75] Inventors: Ryoichiro Sasano; Tsutomu Toyohara; Toshimichi Takigawa, all of Kobe, Japan

[73] Assignee: Mitsubishi Jukogyo Kabushiki Kaisha, Japan

[21] Appl. No.: 881,064

[22] Filed: Jul. 2, 1986

Related U.S. Application Data

[62] Division of Ser. No. 593,628, Mar. 26, 1984, Pat. No. 4,617,845.

[30] Foreign Application Priority Data

Mar. 29, 1983 [JP] Japan .................................. 58-51574

[51] Int. Cl.$^4$ ............................ B23B 3/28; B23B 5/40
[52] U.S. Cl. ..................................... 82/2 D; 82/14 C; 82/18
[58] Field of Search ................... 82/2 D, 14 R, 14 A, 82/14 B, 14 C, 24 R; 318/571, 578

[56] References Cited

U.S. PATENT DOCUMENTS

| | | |
|---|---|---|
| 2,641,151 | 6/1953 | Lee ...................................... 82/24 R |
| 2,777,349 | 1/1957 | Johnson ................................ 82/2 D |
| 3,582,749 | 6/1971 | Wenzel ................................. 318/578 |
| 3,983,769 | 10/1976 | McConnell et al. ................. 82/2 D |
| 4,176,565 | 12/1979 | Christoph ............................. 82/12 |
| 4,617,845 | 10/1986 | Sasano et al. ....................... 82/2 D |

FOREIGN PATENT DOCUMENTS 1443216  4/1965  France .

Primary Examiner—Nicholas P. Godici
Assistant Examiner—Jerry Kearns
Attorney, Agent, or Firm—McGlew and Tuttle

[57] ABSTRACT

This invention relates to a method of forming a spherical surface of a hemispherical shell having projections on its inner and outer surfaces and an apparatus for working the hemispherical shell, which are particularly suitably applied to a large-scale spherical pressure resisting shell for forming a control chamber in an abyssal diving research vessel.

2 Claims, 16 Drawing Figures

FIG. I (a)   FIG. I (b)   FIG. I (c)
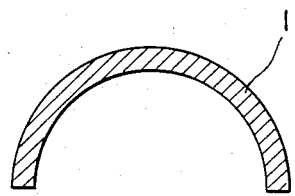 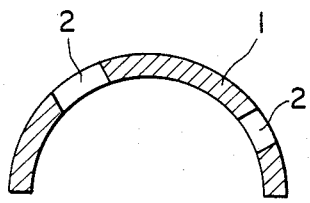 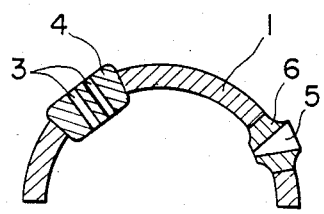
FIG. 2(a)
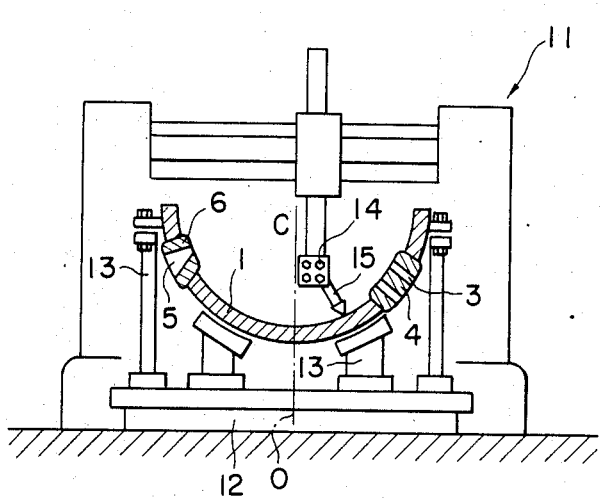
FIG. 2(b)
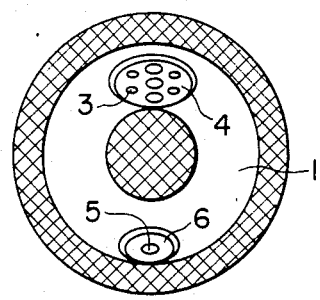

APPARATUS FOR WORKING PERIPHERAL WALL OF HEMISPHERICAL SHELL

This is a division of application Ser. No. 593,628 filed Mar. 26, 1984 now U.S. Pat. No. 4,617,845.

FIELD AND BACKGROUND OF THE INVENTION

This invention relates to a method of spherically forming spherically a hemispherical shell having projections on its inner and outer surfaces and an apparatus for working said hemispherical shell, which are particularly suitably applied to a large-scaled spherical pressure resisting shell for forming a control chamber in an abyssal diving research vessel.

In the abyssal diving research vessel for researching the bottom of an ocean or the like, since a crew embarks in a spherical pressure resisting shell acting as a control chamber, the shell has to have a hatch through which the crew has access to this pressure resisting shell, a viewing window or a hole through which various control cables penetrate or the like. Generally, while the pressure resisting shell is finished by interconnecting and welding a pair of hemispherical shells that are worked spherically, it is preferable for operability and prevention of the pressure resisting shell from an adverse thermal effect caused by welding that a flange for mounting the hatch on the hemispherical shell, a sash for the viewing window or the hole through which the cable penetrates or the like are worked before finishing said shell. In this case, to maintain the strength of the pressure resisting shell, the surroundings of said flange, sash portion or cable penetrated hole have to possess the wall thickness larger than a other portions. Thus, said hemispherical shell is provided with a large diameter hole for forming the hatch, viewing window or cable penetrated hole, and annular large thickness metal fittings providing the flange and sash or formed with the cable penetrated hole are fitted in and welded to said large diameter hole.

Now, when the inner peripheral wall of such a hemispherical shell is worked spherically and a portion of said thick metal fittings projects from the inner peripheral wall of the hemispherical shell, a portion of connection between the hemispherical shell and the large thickness metal fittings provides a dead angle to a cuting tool in an existing three-dimensional cutting method so that such a portion cannot be cut since the projecting portion of the thick metal fittings interferes with the cutting tool. Thus, in conventional working methods before the thick metal fittings are fitted in the hemispherical shell and welded thereto, the inner peripheral wall of the hemispherical shell has been spherically worked and then the large diameter hole is provided in the hemispherical shell to fit and weld the thick metal fittings thereto. In such a working method, however, welding stress remains in the finished hemispherical shell so that the wall thickness of the pressure resisting shell has to be thicker than necessary to ensure a predetermined pressure resisting force. When the abyssal diving research vessel is adapted to travel in the abyss, it is important that the drive energy is minimized by counterposing the weight of said vessel to the buoyancy of same to improve the mobility of the vessel. Since in the present technology, however, the weight of the abyssal diving vessel is far larger than the buoyancy of same and further a great amount of buoyant materials needs to be mounted on said vessel, a large scale and expensive vessel cannot be avoided.

SUMMARY OF THE INVENTION

An object of the present invention is to provide a working method for eliminating defects produced in conventionally working pressure resisting shells and for spherically the inner peripheral wall of a hemispherical shell to minimize the wall thickness of the shell, resulting in the provision of a light weight pressure resisting shell and a compact and economical vessel.

According to the method of the present invention for achieving this object, a method is proposed in which the inner peripheral wall of the hemispherical shell formed on some portions of the inner and outer peripheral walls with projections, is worked by one process for working portions of said inner peripheral walls not formed with said projections in rotating said hemispherical shell about the symmetrical axis of said shell and by another process for working said projections with said hemispherical shell being fixed.

Thus, by the method according to the present invention, the inner peripheral wall of the hemispherical shell can be cut for after thick metal fittings have previously been welded to said hemispherical shell so that it can be finished spherically to the working accuracy of a machine tool without being affected by later applied welding stress. As a result, since the wall thickness of the hemispherical shell can be minimized, a light weight pressure resisting shell and thus a compact and economical abyssal diving research vessel can be provided.

According to the present invention, a profile surfacing apparatus is provided for profiling the inner or outer surface of said hemispherical shell to any curved surfaces. To achieve this object, said surfacing apparatus comprises an apparatus body mounted on a boring head of a boring machine, a rotary flange rotatably supported by said apparatus body while receiving the rotational drive force of a main spindle of the boring machine, a rotary arm provided on an end of this rotary flange and having a slidable guide section consisting of a slide groove and a slide bore portion in the direction perpendicular to a shaft of said rotary flange, a cutting tool holder provided with a slide head slidable along said slide guide section of the rotary arm and a cutting tool and provided on said slide head slidably parallel to the axis of said rotary flange and a profiling unit subjected to the profiling movement in the directions of cutting and cutting feeding said cutting tool along a template mounted to said rotary arm.

Conventionally, required strength and accuracy are obtained from even conventional welded structures when working pressure is about 2,000 atmospheric pressure. According to said profile surfacing apparatus, however, said shell is able to be cut out of a solid stock with satisfactory strength, accuracy or reliability even if the working pressure is as high as about 6,000 atmospheric pressure.

Also in the present invention, there exist areas which cannot be subjected to a turning operation in working the inner or outer diameter of said hemisphrical shell blank since projections such as the viewing window with a predetermined outer diameter are provided. In such a case, said shell must be finished by a ball end mill used in a multiple spindle control machinery for example. However, the turning operation of the inner and outer diameter of the hemispherical shell requires high accuracy from the view point of strength and reliability so that enormous working time and cost was needed in the conventional working method. As a working apparatus in such cases, a three dimensional working apparatus is provided with a turning operation aimed at improving the strength and reliability of the pressure resisting spherical shell, with a high design of accuracy and to reduce the production cost by continuously working areas, other than those of projections such as a viewing window, even when they are in the way of working the inner and outer surfaces of the pressure resisting spherical shell.

This working apparatus comprises a model ring having an outer diameter provided in a position opposed to the projections of the thick metal fittings formed on the working surfaces of a workpiece, the ring being formed with spaces cut out corresponding to the projections of said workpiece, while magnetic body portions on the outer diameter of said model ring and non-magnetic body portions in the space are detected by detecting means. On the other hand, the detecting signal of the detecting means acts on a fluid direction change-over solenoid valve to displace instantaneously a fluid cylinder built in a fluid controlled tool rest and a cutting tool for permitting the turning operation without any interference with the projections of said workpiece.

Further, according to the present invention, a fluid controlled tool rest is provided which is constituted such that, when said areas which cannot be subjected to the turning operation is worked, the fluid direction changeover solenoid valve receives the position detecting signal of projections on the hemispherical shell to control the flow direction of fluid, supply the controlled fluid to the fluid controlled tool rest and apply continuously the turning operation to the inner and outer diameter areas other than those of the projections on the spherical shell and which aims to improve the strength and reliability and reduce the production cost of the pressure resisting spherical shell.

This fluid controlled tool rest comprises a model ring for detecting the positions of projections formed on the hemispherical shell, a tool rest body constituted to supply fluid controlled by the fluid direction change-over solenoid valve to a fluid pressure chamber consisting of a fluid cylinder and a piston, said valve being operated by electric signals from the detecting means for detecting non-magnetic body portions corresponding to the projections of said model ring and magnetic body portions and a cutting tool fixed integrally with the fluid cylinder provided slidably on the tool rest body, whereby said fluid cylinder and cutting tool are instantaneously displaced by fluid pressure supplied to the fluid pressure chamber of said tool rest body to permit the turning operation without any interference with the projections on the spherical shell.

BRIEF DESCRIPTION OF THE DRAWINGS

In the Drawings

FIGS. 1(a) to 1(c) are section views showing an operational process for the fitting and welding of thick metal fittings in an embodiment of working the inner peripheral wall of a hemispherical shell according to the present invention;

FIGS. 2(a), 3(a) and 4(a) are sectional views showing procedures for working the inner peripheral wall of said hemispherical shell;

FIGS. 2(b), 3(b) and 4(b) are explanatory views representing working portions for spherical working in respective processes;

DESCRIPTION OF THE PREFERRED EMBODIMENT

Figure 3A:
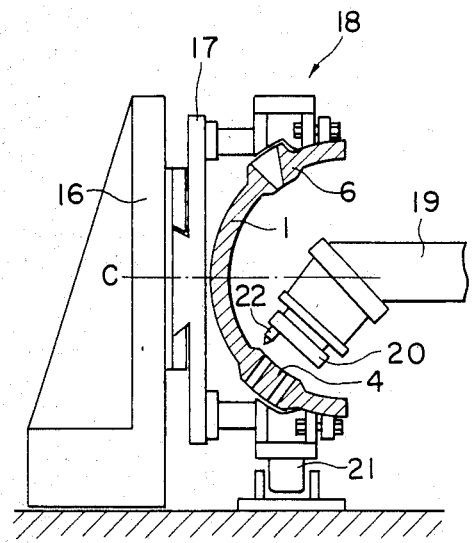
Figure 3B:
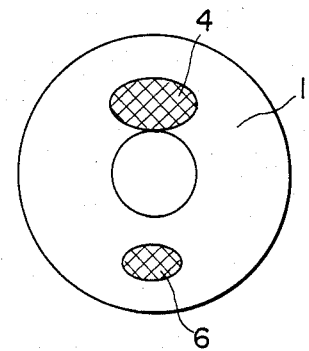

Hereinafter will be described a working method according to the present invention with reference to an embodiment thereof. FIGS. 1(a) to 1(c) show preprocessing processes and FIGS. 2(a) to 4(b) show cutting processes.

Referring to FIGS. 1(a) to 1(c), a hemispherically formed shell blank 1 is provided in predetermined positions with large diameter holes 2 as shown in FIG. 1(b) and a thick metal fitting 4 provided with cable penetrated holes 3 and a thick metal fitting 6 for a viewing window 5 are fitted in said holes 2 and welded thereto as shown in FIG. 1(c). Further, while in this embodiment the thick metal fittings 4, 6 for said cable penetrated holes 3 and viewing window 5 are respectively fitted in the large diameter holes 2 of the hemispherical shell blank 1 and welded thereto, only one of them may be fitted and welded or a thick metal fitting for a hatch or the like may be fitted and welded.

Next will be described the cutting method according to the present invention with reference to FIGS. 2(a) to 4(b).

As shown in FIG. 2(a), said hemispherical shell blank 1 is mounted on a turntable 12 of a vertical lathe 11 and located fixedly positively through a fixing jig 13 such that the inner peripheral wall of said hemispherical shell blank 1 is directed upward and the symmetrical axis C thereof coincides with the axis 0 of the turntable 12. Then, when the turntable 12 is driven rotatably, cutting tool 15 mounted on a tool rest 14 is fed radially and vertically of the hemispherical shell blank 1 to apply the turning operation to portions in which the cutting tool 15 does not contact with the thick metal fittings 4, 6 (portions hatched with cross inclined lines) as shown in FIG. 2(b). In this case, the cutting tool 15 is controlled by a numerical control unit such that the locus of moving end of the cutting tool 15 provides an arc with a certain radius of curvature centering around the imaginary center of the hemispherical shell blank 1. Thereafter, the hemispherical shell blank 1 is mounted as shown in FIG. 3(a). Namely, the hemispherical shell blank 1 is fixed through a fixing jig 18 to a vertical rotary plate 17 mounted rotatably on a vertical frame 16 such that the symmetrical axis C of the hemispherical shell blank 1 is horizontally coaxial with the vertical rotary plate 17. Next, a face plate 20 at an end of an angular attachment 19 mounted on a boring machine (not shown) and the surfaces of the thick metal fittings 4, 6 are set coaxially opposed to each other.

Then, a drive roller 21 bearing against the outer peripheral surface of said fixing jig 18 is driven to turn the hemispherical shell blank 1 while the inclined surface of the face plate 20 is adjusted. Next, while the face plate 20 of the angular attachment 19 is driven, the surfaces of the thick metal fittings 4, 6 are surfaced by a cutting tool 22 mounted on the face plate 20 and movable radially along with the rotation of the face plate 20 as shown in the portions hatched with cross slant lines of FIG. 3(b). In this case a profiling apparatus may be also used for combining the radial movement of the cutting tool 22 with a movement of tool moving toward and away from the thick metal fittings 4, 6 (movement parallel to the rotary axis of the face plate 20) to work three-dimensionally the surfaces of the thick metal fittings 4, 6 projecting from the inner peripheral wall of the hemispherical shell blank 1.

Further the operation shown in FIG. 3(a) is able to be carried out before the operation shown in FIG. 2(a) and in place of the tool rest 14 of the vertical lathe 11 shown in FIG. 2(a) the angular attachment 19 may be attached to drive the face plate 20 with any suitable means so that the operation is able to be continued as the hemispherical shell blank 1 is fixed to the turntable 12 without replacing said hemispherical shell blank 1.

Figure 4A:
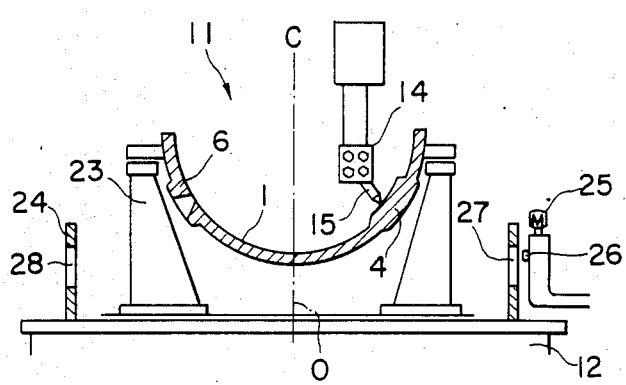
Figure 4B:
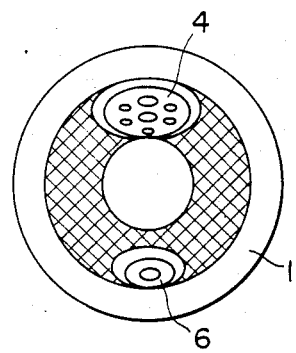

After the completion of operation shown in FIG. 3(a), the hemispherical shell blank 1 is again transferred onto the turntable 12 of the vertical lathe 11, while it is fixed by a fixing jig 23 as shown in FIG. 4(a) such that the symmetrical axis C is also coaxial with the axis O of the turntable 12. A profiling plate 24 having a cylindrical section is provided on the turntable 12, and a motor 25 is controlled to move an or proximity switch 26 vertically along this profiling plate 24 in synchronization with the vertical movement of the cutting tool 15 at the end of the tool rest 14. Also, the profiling plate 24 is formed with holes 27, 28 in positions respectively corresponding to the thick metal fittings 4, 6 and since these holes 27, 28 function as projected images of the thick metal fittings 4, 6 the relationship between the cutting tool 15 and the thick metal fittings 4,6 is adapted to accurately correspond to that between the approach switch 26 and the holes 27, 26. Thus, when the approach switch 26 fixed irrespective of the rotation of the turntable 12 detects the positions of holes 27, 28 the cutting tool 15 moves in the radial direction of the turntable 12 or in the vertical direction perpendicular thereto not to collide with the thick metal fittings 4, 6 so that portions hatched by cross slant lines as shown in FIG. 4(b) are subjected to the turning operation and the whole inner peripheral wall of the hemispherical shell blank 1 will be worked spherically accurately as a whole. Further, various conventional well-known means other than that of this embodiment may be of course used for means for detecting the relative position of the thick metal fittings 4, 6 with respect to the cutting tool 15. Also, the process shown in FIG. 4(a) may be performed for the first time or before the process shown in FIG. 3(a). Further, the process shown in FIG. 2(a) may be performed finally or the whole procedures may be utterly reversed.

Figure 5:
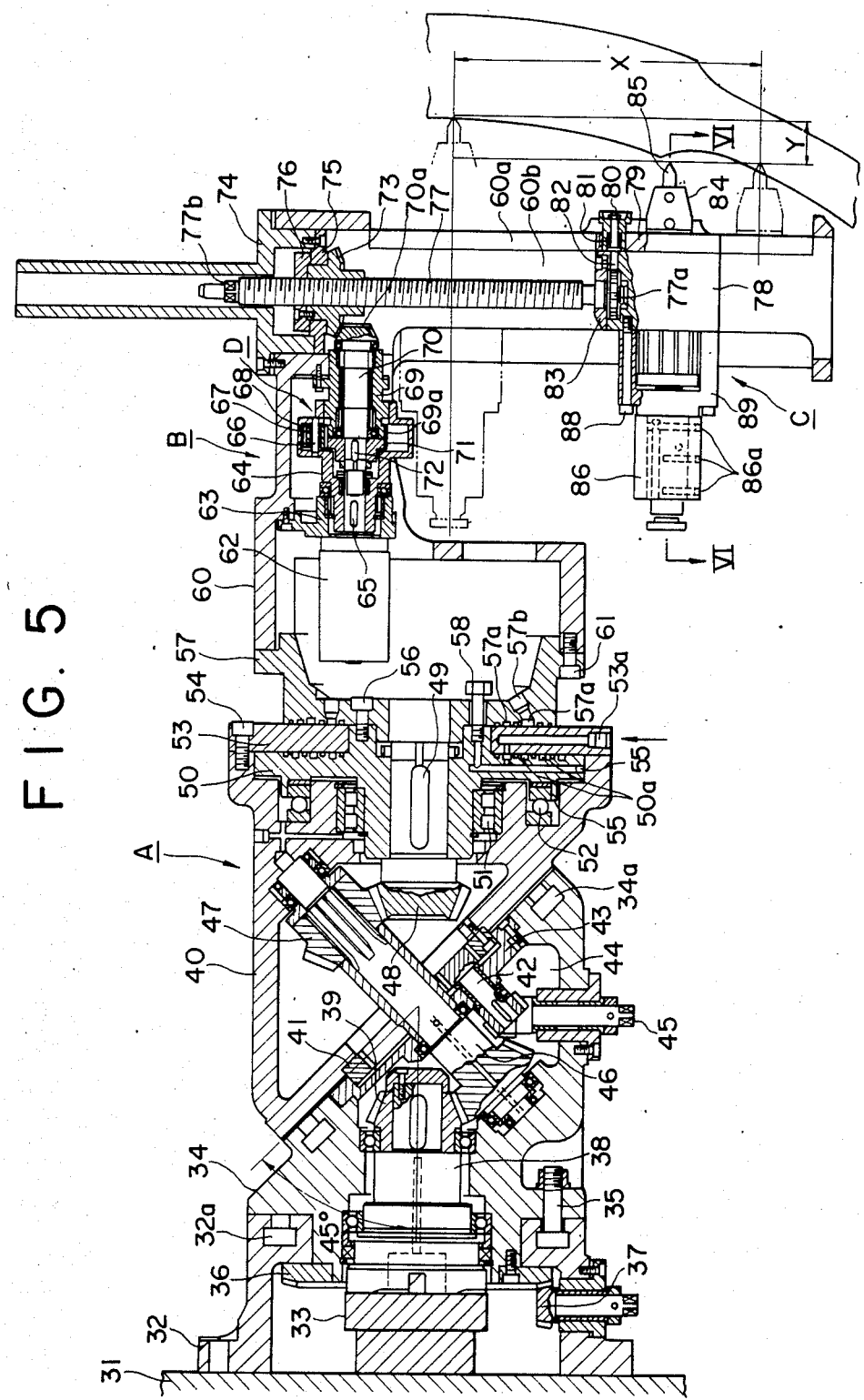
FIG. 5 is a longitudinal cross-sectional view of an embodiment of a profile surfacing apparatus for profile surfacing the hemispherical shell according to the present invention.

Next, the profile surfacing apparatus for working the hemispherical shell blank 1 shown in FIG. 3(a) will be described with reference to FIGS. 5 and 6.

Said profile surfacing apparatus is attached for use to a boring head 31 of a boring machine, for example, a horizontal boring machine. Referring to the constitution of the apparatus body A, a mounting casing 32 is fixed integrally with the boring head 31 through a flange portion by bolts (not shown). In the center portion of the mounting casing 32 is disposed a spindle rotating joint 33 connected to a main spindle of the horizontal boring machine for transmitting a drive force to the apparatus body A. In an end of said mounting casing 32 is fitted rotatably the base end of an intermediate casing 34 having the flange portion inclined 45° to the axis of the spindle rotating joint 33, and said base end is adapted to be fixed by bolts 35 attached to a T-sectioned groove 32a formed in the mounting casing 32 after the intermediate casing 34 is rotated to any positions. A bevel gear 36 is fixed integrally with the base end surface of the intermediate casing 34 through bolts for rotating the intermediate casing 34, and a bevel gear 37 mounted on the mounting casing 32 meshing with the bevel gear 36 is manually rotated for rotational adjustment. In the center portion of the intermediate casing 34 is incorporated a rotatable drive bevel gear shaft 38 supported rotatably through a ball bearing. The base end of the rotary drive bevel gear shaft 38 is connected to the spindle rotating joint 33 while a bevel gear 39 fits fixedly the other end of said shaft through a key, a shrouding ring or the like.

An end casing 40 having the base end mounting portion inclined 45° is connected rotatably to the flange portion inclined 45° at the end of the intermediate casing 34 is to be fixed to any positions by bolts attached to a T-sectioned groove 34a. An internal gear 41 is mounted on the base end through bolts to rotate this end casing 40. A spur gear shaft 42 provided with a spur gear meshing with this internal gear 41 is supported rotatably by a bearing plate 43 mounted on the intermediate casing 34, and a spiral gear shaft 45 provided with a spiral gear meshing with a spiral gear 44 at the other end of said spur gear shaft 42 is mounted on the intermediate casing 34. Thus, the end casing 40 is able to be rotatably adjusted to any positions by manually rotating the spiral gear shaft 45.

Also, an intermediate bevel gear shaft 46 provided with a bevel gear meshing with the bevel gear 39 to transmit a rotary drive force from the main spindle, is rotatably supported by the intermediate casing 34 and the end casing 40 at the center of the 45° inclined surfaces of the respective casings 34, 40 and vertically. A bevel gear 47 fits through spline on an end portion of the intermediate bevel gear shaft 46 which is located within the end casing 40.

Also, a bevel gear end shaft 48 provided with a bevel gear meshing with the bevel gear 47 is arranged coaxially with the rotary drive bevel gear shaft 38 of the intermediate casing 34, and a rotary flange 50 fits through a key 49 on the bevel gear end shaft 48, while supported by a roller bearing 51 and a thrust bearing 52, so that the bevel gear end shaft 48 and the rotary flange 50 are rotatable and the rotary drive force of the main spindle is transmitted. This rotary flange 50 is located by fixing a holding flange 53 to the end casing 40 by bolts 54. A gap between the rotary flange 50 and the holding flange 53 is adjusted for assembly by a thrust adjusting plate 55 interposed between the thrust bearing 52 and the rotary flange 50. Also, the end of the rotary flange 50 is mounted a rotary adapter 57 having the rotary drive force transmitted through a bolt 56. And the rotary flange 50, holding flange 53 and rotary adapter 57 are provided with a function of a rotary joint for fluid supplied to a hydraulic drive apparatus. Namely, the holding flange 53 at the fixed side is formed with a joint screw 53a and connected to a piping hose or the like from a fluid pressure supply source not shown, while flow path grooves 50a, 57a communicating to a flow path of the holding flange 53 are formed on the rotary flange 50 and the rotary adapter 57 by the necessary number for the hydraulic drive apparatus and sealed with O-rings. On the other hand, in the rotary adapter 57 are provided a joint screw 57b and a joint metal fitting 58 communicating with fluid grooves 50a to 57a respectively, and a screw plug is threaded into an end of the flow path to prevent fluid pressure from leakage while holding the pressure. While the rotary drive force is transmitted by apparatus body A, the end face of the rotary adapter 57 is to be set to any positions and angles by the end casing 40 and the intermediate casing 34.

Next will be described a rotary arm mechanism B connected to the apparatus body A to be rotatably driven, a cutter mounting section C mounted on an end of the rotary arm mechanism B, a cutting feed mechanism D for sliding radially the cutter mounting section C to give the cutting feed and further a profiling mechanism E for feeding the cutter mounting section C in the cutting direction.

The base end of a rotary arm 60 as the rotary arm mechanism B is fastened to an end of the rotary adapter 57 by a bolt 61 to be rotated integrally therewith, and the point end of the rotary arm 60 is integral with an arm section extending in the direction perpendicular to the rotary axis so that the cutter mounting section C is able to slide radially along a slide groove 60a and a slide inner diameter portion 60b opposed to each other. The cutting feed mechanism D is built in the rotary arm 60 and an oil hydraulic motor 62 as a drive source is mounted on a bearing flange 63 mounted on the rotary arm 60. Therefore hydraulic pressure is supplied and discharged through said joint screw 57b and joint metal fitting 58. On this oil hydraulic motor 62 is mounted a carrier 64 of a reduction gear constituted from a planet gear unit through a key 65, and the carrier 64 is rotatably supported by a bearing bushing and a thrust bearing between the carrier 64 and the bearing flange 63. On this carrier 64 is mounted a gear shaft 66 and a planet gear 68 is mounted rotationally through a bearing bushing 67 fitting on the outer periphery of the gear shaft 66. Also, a hollow fixed gear shaft 69 aligned with the axis of the oil hydraulic motor 62 is fixed to the flange portion of the rotary arm 60 by bolts to rotate integrally with the rotary arm 60 without rotation relative to the rotary arm 60. A fixed gear 69a mounted on this fixed gear shaft 69 meshes with the planet gear 68 while a feed bevel gear shaft 70 provided on the end with a bevel gear 70a is supported rotatably in the hollow portion of the fixed gear shaft 69 and on the base end of said gear shaft 70 is mounted through a key 72 a differential gear 71 of profile shifted gear having the number of teeth different one tooth from the fixed gear 69a and the planet gear 68 meshes with said gear 71. And a bevel gear 73 meshing with the bevel gear 70a is built in the arm portion of the rotary arm 60 and rotatably supported by a bearing flange 75 and a thrust carrier plate 76 mounted on the end face of a feed screw cover 74 mounted on the arm portion. And a feed screw 77 is threaded into the female screw portion in the center of the bevel gear 73 and slided radially while rotating on its own axis along the rotary arm 60 by the rotation of the bevel gear 73.

The cutter mounting section C is mounted on the top end of the feed screw 77. In their connection, this feed screw 77 is formed on its end with a clutch claw portion 77a, while a slide plate 79 is provided which is mounted on a slide head 78 constituting the cutter mounting section C to slide along a slide groove 60a in the rotary arm 60. An adjusting screw 80 is threaded into this slide plate 79, and a clutch pin 82 pressed through a spring 81 inserted in an end of this adjusting screw 80 fits connectively the clutch claw portion 77a to maintain a turning force of the feed screw 77, i.e. turning force of the bevel gear 73. Also, a holding plate 83 fixed to the slide head 78 by bolts is provided on the upper end of the clutch claw portion 77a of the feed screw 77, and the feed screw 77 extends rotatably through this holding plate 83. Thus, when the bevel gear 73 is rotatably driven and the feed screw 77 is slidably rotated, the slide head 78 and the slide plate 79 slide by stroke X along the slide groove 60a and the slide inner diameter portion 60b of the rotary arm 60 through the clutch pin 82 fitting the clutch claw portion 77a.

Figure 6:
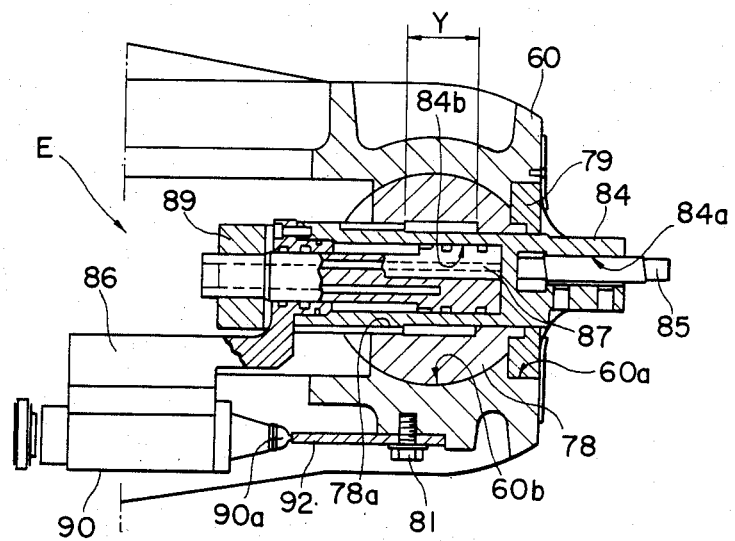
FIG. 6 is a cross-sectional view taken along line VI—VI of FIG. 5.

The slide head 78 is formed on the end with a cutting tool mounting hole 84a as shown in FIG. 6, and on the base end is mounted slidably in the cutting direction through a spline 78a a cutting tool holder 84 having a cylinder hole 84b. Thus, a cutting tool 85 inserted in the cutting tool mounting hole 84a is adapted to be fastened by a bolt.

Next the profiling mechanism E which slides the cutting tool 85 in the cutting direction along with the cutting feed will be described. In this profiling mechanism E, a valve mounting cover 86 is fixed by bolts to close a cylinder hole 84b in the cutting tool holder 84, while a piston 87 provided with a fluid pressure holding ring goove and a fluid pressure holding packing is attached in the cylinder hole 84b and a piston rod extends slidably through the valve mounting cover 86. An end of this piston rod is fixedly threaded into a support arm 89 fixed to the slide head 78 by a bolt 88. Thus, the cutting tool holder 84 slides by stroke Y along the spline 78a of the slide head 78 outside the piston 87 by controlling fluid pressure supplied into the cylinder hole 84b. Also, a fluid controlling valve 90 is mounted on the valve mounting cover 86 by bolts, and the controlled fluid is supplied from a hydraulic rotary joint of said holding flange 53 through a hydraulic joint screw hole 86a formed in the valve mounting cover 86.

This fluid controlling valve 90 is provided on the end with a stylus 90a which is pressed against a template 92 mounted on the rotary arm 60 by a bolt 81 and moves along the profile of the template 92 together with the slide head 78.

Thus, within the range of working by the working section, the stroke X of the slide head 78 and the stroke Y of the cutting tool holder 84 are determined while the profile of the template 62 is also formed.

Next the operation of the thus constituted profile surfacing apparatus will be described.

First, before the working, a fluid pressure supply source (not shown) is connected to the joint screw 53a of the holding flange 53 to permit control from the fluid pressure supply source side while the mounting casing 32 is secured fixedly by bolts to mount the apparatus body A on the boring head 31 of the horizontal boring machine and provide a condition that the workpiece is adjustably centered and the working portion of the workpiece coincides with the profile of the template 92.

When the main spindle of the horizontal boring machine is rotated under such condition, the rotary drive force of the main spindle is transmitted to a spindle rotary joint 33 and then rotates the rotary flange 50 through the bevel gear 39 integral with the rotary drive bevel gear shaft 38, intermediate bevel gear shaft 46, bevel gear 47 and bevel gear end shaft 48. On the other hand, the rotary adapter 57 integral with the rotary flange 50 and the rotary arm 60 are simultaneously rotatably driven. Then, the apparatus built in the rotary arm 60, cutter mounting section C provided on the end of the rotary arm 60, cutting feed mechanism D and profiling mechanism E are all simultaneously rotated. The rotation of this rotary arm 60 provides the rotational power of the cutting tool 85 to give a predetermined cutting through the profiling mechanism E while giving a predetermined cutting feed through the cutting feed mechanism D so that the workpiece is subjected to the cut working. Under such a condition, the rotary arm 60 is rotated, while the controlled fluid from said fluid pressure supply source is supplied to the feed drive motor 62 and the fluid controlling valve 90 from the flow path grooves 50a, 57a through the joint screws 53a, 57b and the joint metal fitting 58. When the controlled fluid is supplied to the feed drive motor 62, the carrier 64 of the reduction gear of-planet gear is rotated integrally through the key 65. Therefore, the planet gear 68 performs the planetary rotational motion on the pitch circle drawn by the mesh of the fixed gear 69a with the differential gear 71, and the differential deceleration rotation produced by the differential gear 71 is transmitted to the feed bevel gear shaft 70. Further, the differential deceleration rotation is transmitted to the bevel gear 73 threaded onto the feed screw 77 and the slide head 78 integral with the feed screw 77 slidably moves simultaneously. The stylus 90a of the fluid controlling valve 90 pressed beforehand against the template 92 having the profile coinciding with the working shape of the workpiece is slidably moved by the slidable movement of the slide head 78 together with the slide head 78. Then, the fluid controlled by the fluid controlling valve 90 is introduced into a fluid flow path formed in the piston 87 through a fluid joint screw hole 86a and supplied to the cylinder hole 84b in the cutting tool holder 84 so that the cutting tool holder 84 slides in the cutting direction along the profile of the template 92 to perform the profile cut working with the cutting tool 85 mounted in the cutting tool mounting hole 84a of the cutting tool holder 84.

Further, under the condition of suspension before working the slide head 78 is located by rotating the adjust screw 80 to disengage the clutch pin 82 from the clutch claw portion 77a of the feed screw 77 for hooking a wrench or the like not shown on a chamfered portion 77b on the upper end of the feed screw 77 and manually rotating the feed screw 77. And after the position of the slide head 78, i.e. the position of the cutting tool 85 has been adjusted, the location of the slide head 78 is completed by fitting the clutch pin 82 in the clutch claw portion 77a.

Thus, according to the present invention, the apparatus body A is mounted on the boring head 31 of the boring machine such as horizontal boring machine, and the end face of the rotary adapter 57 is able to be set at any angles by rotatably fixing the rotary adapter 57 between the mounting casing 32 and intermediate casing 34 constituting said apparatus body A and between the intermediate casing 34 and end casing 40 respectively. Also, since the rotary arm mechanism B provided with the rotary arm 60, cutting tool mounting section C, cutting feed mechanism D and profiling mechanism E are mounted on the rotary adapter 57, the profile working can be simply carried out by the rotary drive force of the main spindle of the boring machine.

While the profile surfacing apparatus used for the present invention has been hereinbefore discribed, said surfacing apparatus does not need any expensive multiple spindle control machine facilities, but is to reduce substantially the working time compared with that taken by an arc control working method using a ball end mill in the multiple spindle control machine facilities. Thus, the product cost is to be advantageously reduced.

An apparatus for working the hemispherical shell blank 1 shown in FIG. 4(a) will now be described with reference to FIGS. 7 to 9.

A column of a well-known vertical lathe with NC unit is designated by reference number 101, a cross rail by 102, a main spindle head by 103, a ram by 104 and a NC servo motor by 105. The output shaft of the NC servo motor 105 is connected to a ball screw 106, and the NC servo motor 105 is operated by the X-axis signal command of the NC unit to slidably move the main spindle head 103 in the left and right X-axis direction on the cross rail 102. Also, the output shaft of a NC servo motor 107 is connected to a ball screw built in the main spindle head 103, and the NC servo motor 107 is operated by the Z-axis signal command of the NC unit to slidably move the ram 104 in the vertical Z-direction within the main spindle head 103. A tool rest 108 is fastened integrally with an end of the ram 104 by bolts or the like. A turntable is designated by 109 and a fixture by 110. A workpiece is fixed directly to the turntable 109 through chuck claws or the like according to the shape of the workpiece. The workpiece 1, a hemispherical shell blank, is shown as a pressure resisting spherical shell having thick metal fittings 6 such as a viewing window in this embodiment. A holding metal 111 fastens the workpiece 1 on the flange portion with bolts to fix the workpiece 1 integrally with the holding metal.

On the other hand, a model ring mounting plate 113 is fixed to the turntable 109 with bolts and has a model ring 114 fixed thereto. An approach or proximity switch 115 is provided close to the outer diameter portion of the model ring 114 to detect magnetic or non-magnetic portions according to the shape of the model ring 114 and provide a detecting means for generating electric signals. An auxiliary column 116 is fixed integrally with said column 101, while the output shaft of a NC servo motor 117 is connected to a ball screw 118. The NC servo motor 117 is operated by the same Z-axis signal command as the Z-axis signal of the NC unit for commanding the NC servo actor 117 so that the ball screw 118 is rotated to slidably move a slide bed 119 in the vertical Z-axis direction on the slide surface, while the approach switch 115 fixedly threaded into the slide bed 119 moves slidably together with the slide bed. A fluid controlled tool rest 120 in which a hydraulic cylinder and a piston are built is constituted such that electric signals detected by the approach switch 115 are transmitted to a fluid direction change-over solenoid valve (not shown) at the fluid pressure generating source side and a cutting tool 121 fixed to the fluid controlled tool rest 120 is displaced in the direction of arrow a according to the fluid flow of the fluid direction changeover solenoid valve.

Figure 8:
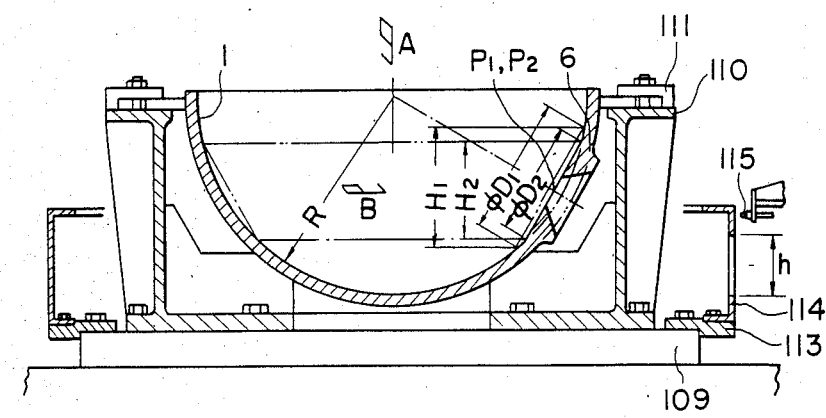
FIG. 8 is a cross-sectional view showing a part of FIG. 7.
Figure 9:
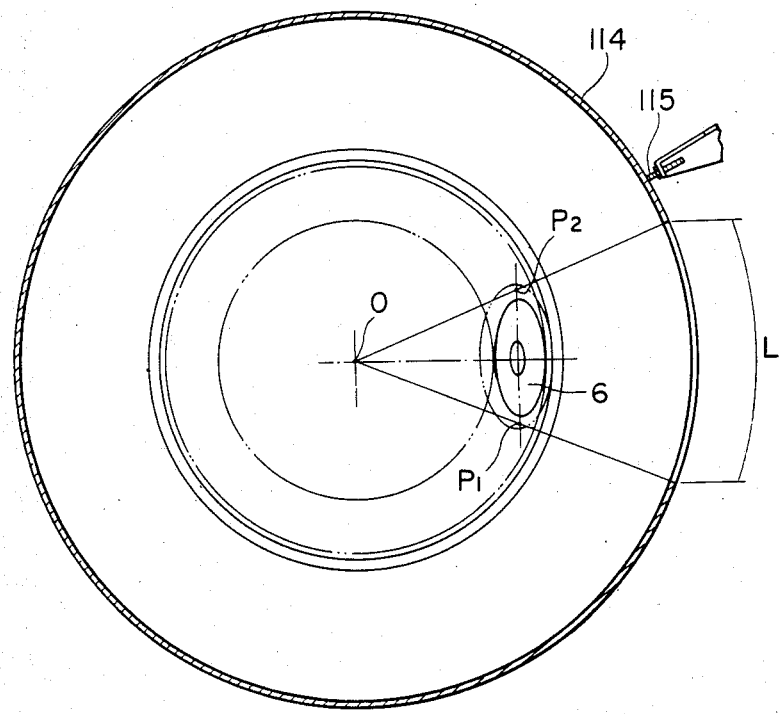
FIG. 9 is a plan view as viewed in the direction of arrow A of FIG. 8.

FIGS. 8 and 9 are explanatory views showing the relationship between the thick metal fitting 6 on the workpiece 1, model ring 114 and approach switch 115. Since the diameters $\phi D_1$, $D_2$ and face portions of the thick metal fittings 6 were previously worked by the horizontal boring machine or the like, the width $H_2$ portion is subjected to the turning operation by this working apparatus. In FIG. 9 is shown an arc L defined by intersections of the outer diameter of the model ring 114 and extensions interconnecting the center 0 and points $P_1$ and $P_2$ on a circumference between the width $H_2$ of intersection of $\phi D_2$ and spherical surface of inner radius R and the width $H_1$ of intersection of $\phi D_1$ and spherical surface of inner radius R. In this embodiment, the height h of the outer diameter of the model ring 114 is the half of said width $H_1$, i.e. $h=H_1/2$. This is because the slide displacement amount of the slide bed 119 is the half of the slide amount of the ram 104 on the Z-axis in this embodiment, and the relationship of $h=H_1/N$ is to be obtained from using any 1/N. Also $h=H_1$ may be used. However, the total height of the model ring 114 may be the half of the height of the workpiece 1 to reduce the production cost of the model ring 114.

On the other hand, the shape of the arm L defined by the extension of $\phi D_1$ and $P_1$, $P_2$ of the thick metal fitting 6 and viewed from the spherical surface with inner radius R of the workpice 1 in the direction of arrow B is developed on the outer diameter of the model ring 114, i.e. on $L\times h$ to be cut out. The cut-out portion provides a space through which the non-magnetic portion rotatably passes when the approach switch 115 is rotatably passed. Thus, the magnetic and non-magnetic body portions are formed on the outer diameter of the model ring 114. Also, the relative position of the workpiece 1 fixed to the turntable 109 and the model ring 114 is set such that the center of the thick metal fitting 6 should coincide with the center of non-magnetic body portion of the model ring 114.

Figure 7:
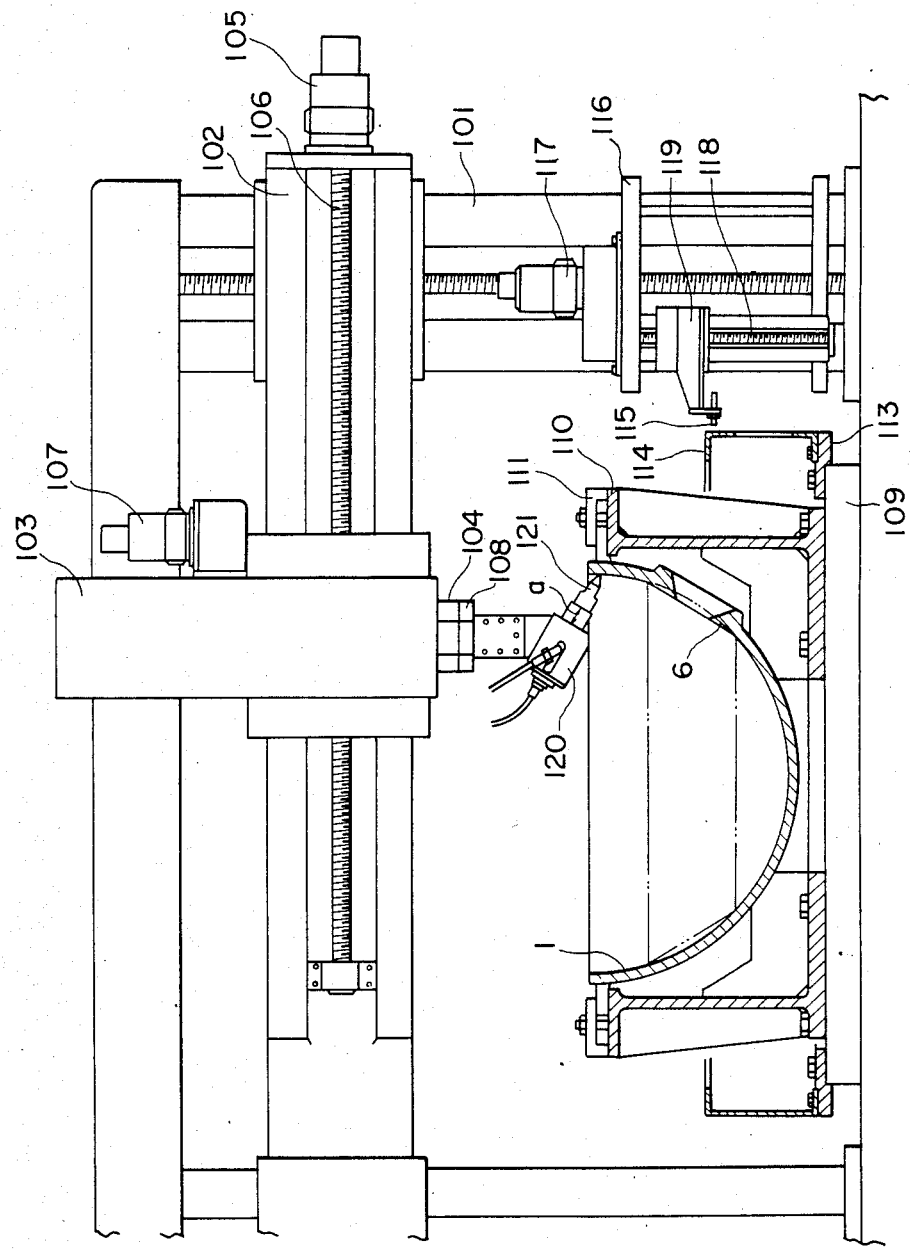
FIG. 7 is a partially cross-sectional view of an apparatus for profiling the hemispherical shell according to the present invention.

In working by the use of thus constituted working apparatus, the workpiece 1 having previously the thick metal fiting 6 worked is first attached to the turntable 109 as shown in FIG. 7, while the model ring 114 is also fixed to said relative position and the cutting edge of the cutting tool 121 is located relatively to the approach switch 115 so that it is adapted to coincide with the origin of Z-axis. Also, in the fluid controlled tool rest 120, the relative positions of the fluid pressure generating source, fluid direction change-over solenoid valve and approach switch 115 are all set to the operating condition. When a predetermined rotation is then given to the turntable 109 and operation commanding signals, i.e. inner radius R spherical surface are cutting command are given to the NC servo motors 105, 107 and 117 from the NC unit, the NC servo motors 105, 107 and 117 are operated so that the cutting tool 121 carries out the turning operation of the inner radius R spherical surface of the workpiece 1. Then the approach switch 115 detects the magnetic body portion on the outer diameter of the model ring 114, while moving slidably with the half speed of that of the moving ram 104 in the same direction as the ram 104. Between the approach switch 115 and fluid controlled tool rest 120 are the fluid pressure generating source and fluid direction change-over solenoid valve. The detecting current of the approach switch 115 acts on the fluid direction change-over solenoid valve, and the fluid cylinder built in the fluid controlled tool rest 120 operates the working inner radius side of the workpiece 1 in the magnetic body portion of the model ring 114 to give the turning operation to the inner radius of the workpiece 112 with the fixed cutting tool 121.

When under such working condition the approach switch 115 detects a space portion of non-magnetic body portion of the model ring 114 corresponding to the thick metal fitting 6 in the workpiece 1, the electric signal acts on the fluid direction change-over solenoid valve to change over the fluid flow direction of the fluid cylinder built in the fluid controlled tool rest 120 so that the fluid cylinder slidably moves away from the inner radius side of the workpiece 1. Thus, the cutting tool 121 fixed to the fluid cylinder is also slidably moved together therewith. Namely the approach switch 115 detects the magnetic and non-magnetic body portions of the model ring 114 and the fluid cylinder and cutting tool 121 in the fluid controlled tool rest 120 are instantaneously displaced in the direction of arrow a through the flow direction change-over solenoid valve while carrying out the turning operation of the inner radius of the workpiece 1 to permit the three-dimensional turning operation even if the thick metal fitting 6 is on the way of the working surface. Further, the working by this working apparatus is not limitted to the turning operation of the inner radius of spherical shell. It is to be applied not only to the turning operation of the outer diameter similarly, but also to the turning operation of plane sufficiently.

Since said working apparatus thus embodied is a simply constructed three-dimensional working apparatus wherein the magnetic and non-magnetic body portions of the model ring in a vertical lathe with a general NC unit are detected by the approach switch to instantaneously displace the fluid cylinder and cutting tool of the fluid controlled tool rest in a predetermined direction through the fluid direction change-over solenoid valve while performing the turning operation of the working surface of the workpiece, the working time is substantially shortened to reduce cost. Also, it is to be applied to a wider range of the turning operation in which projections are on the way of the turning operation surface even if products having shapes suited for the turning operation.

Further description will now be given for the fluid controlled tool rest used in the present invention with reference to FIGS. 10 and 11.

A tool rest body 131 is unified with a mounting portion 131a to be attached to a tool rest (not shown) of a vertical lathe. A fluid cylinder 132 is formed on the outer diameter with a splined shaft portion 132a which slidably fits a splined hole and guide hole provided in the tool rest body 131. Also, a piston is designated by 133 and a piston fixing flange by 134. A male screw 133a on the outer diameter of the piston 133 is threaded into a female screw 134a to be fixed integrally therewith by a nut 135 while mounting the piston 133 integrally with an end face 131b of the tool rest body 131 by bolts 136. A cover 137 is fixed to an end face of the fluid cylinder 132 by bolts 138. The fluid cylinder 132, piston 133 and cover 137 are formed with packing grooves to maintain the fluid pressure, and the fluid pressure chambers 132b, 132c are formed by fluid packings, O-rings or the like. The fluid cylinder 132 slides within the range of stroke L by supplying the controlled fluid pressure to the fluid pressure chambers 132b, 132c. A cutting tool 139 is fixed integrally to a cutting tool inserting hole provided in the fluid cylinder 132 by bolts to move with the slide of the fluid cylinder 2.

Figure 10:
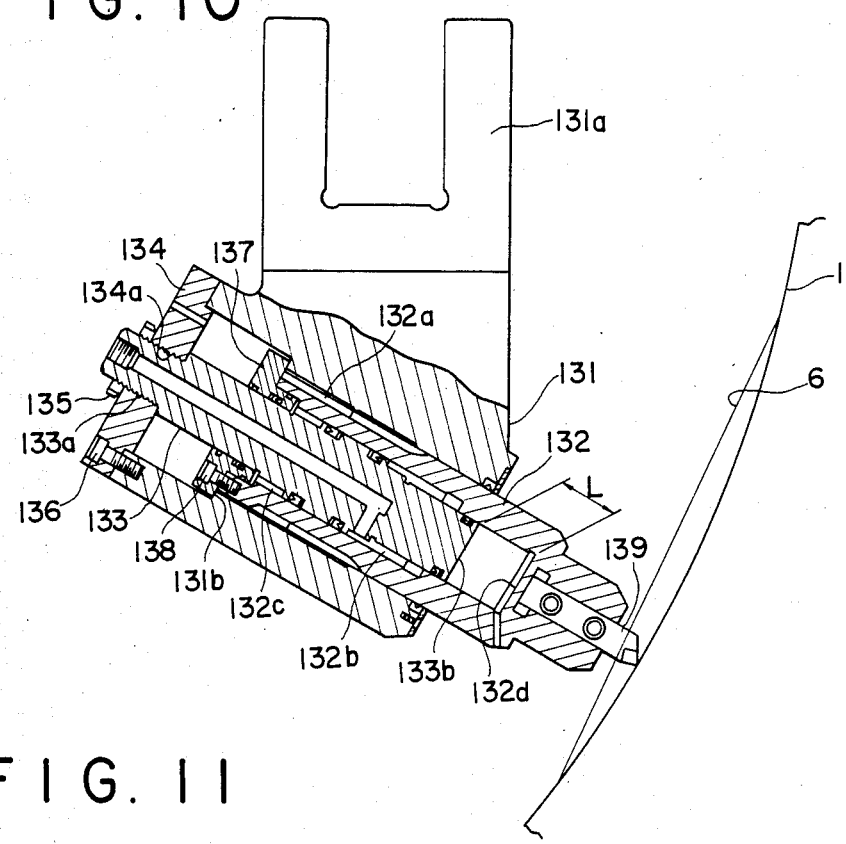
FIG. 10 is a longitudinal cross-sectional view showing a fluid controlled tool rest used for the turning operation of the hemispherical shell according to the present invention.

FIG. 10 shows the condition under which the fluid pressure is supplied to the fluid pressure chamber 132b side of the fluid cylinder 132. The fluid cylinder 132 together with the cutting tool 139 moves slidably on the inner radius side of the hemispherical shell blank 1 until an end face of the cover 137 abuts against the end face 131b of the tool rest body 131. This condition provides a condition in which the inner radius dimension of the hemispherical shell blank 1 coincides with the cutting edge of the cutting tool 139 so that the spherical surface of the inner radius of the hemispherical shell blank 1 is subjected to the turning operation.

Figure 11:
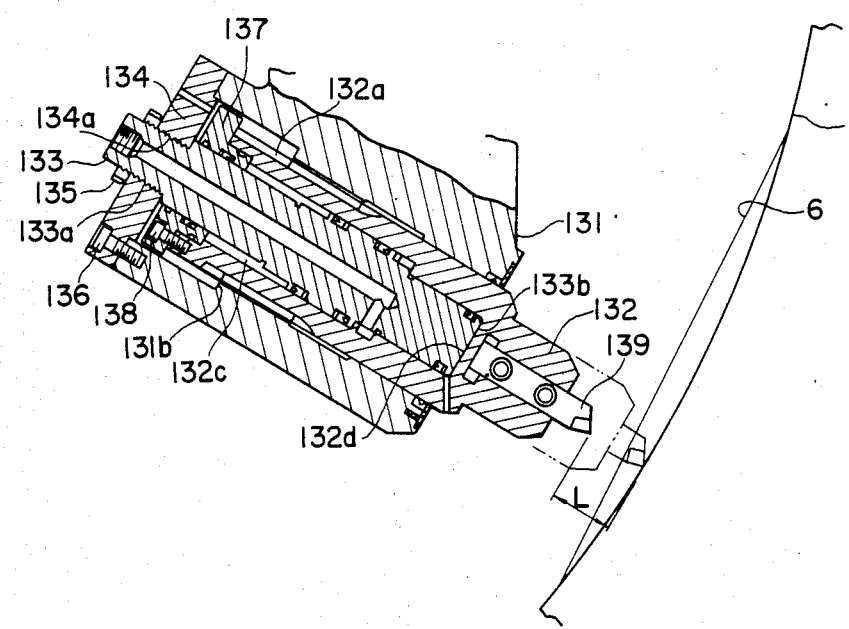
FIG. 11 is a cross-sectional view showing the operational relation between said fluid controlled tool rest and hemispherical shell to be worked.

On the other hand, FIG. 11 shows the condition that fluid pressure is supplied to the fluid pressure chamber 132c side of the fluid cylinder 132, and the fluid cylinder 132 together with the cutting tool 139 moves slidably until an end face 132d abuts against an end face 133b of the piston 133. The working cutting edge of the cutting tool 139 is disengaged from the thick metal fitting 6 formed in the inner radius portion of the hemispherical shell blank 1 not to interfere with the thick metal fitting 6.

The apparatus for performing the continuous turning operation of the spherical inner radius surface of the hemispherical shell blank 1 without interfering with the thick metal fitting 6 formed in a portion of the inner radius portion of the hemispherical shell blank 1 is operatively associated with the fluid controlled tool rest. The apparatus not shown comprises detecting means such as an approach switch which detects the model ring for detecting the position of said thick metal fitting 6, non-magnetic body portion corresponding to the projection of the model ring and magnetic body portion corresponding to the surface to be continuously spherically worked, and permits electric signals from said detecting means to act on the fluid direction changeover solenoid valve and operate the fluid controlled tool rest under the condition that the controlled fluid controlling the fluid of the fluid pressure generating source is to be supplied to the fluid pressure chambers 132b, 132c of said fluid controlled tool rest.

Now, the control fluid detecting the thick metal fitting 6 under the condition of the inner radius turning operation of the hemispherical shell blank 1 acts on the fluid pressure chamber 132c. The fluid cylinder 132 instantaneously slides by stroke L as shown in FIG. 11 and abuts against the end face 132d of the piston 133 or the inside abutting end surface 133b of the piston 133 to move slidably within the range of stroke L. Further, the slidable movement within the range of stroke L is referred to the case in which the flow direction of the controlled fluid is converted until the fluid abuts against the abutting end surfaces 132d and 133d. Also, when the controlled fluid completes the detection of said thick metal fitting 6 and the fluid pressure converted toward the inner radius direction subjected to the turning operation acts on the fluid pressure chamber 132b, the fluid cylinder 132 and cutting tool 139 slidably move to give the turning operation to the spherical inner radius surface of the hemispherical shell blank 1 until the end face of the cover 137 abuts against the end face 131b of the tool rest body 131. By the repetition of such movements, the spherical inner radius surface of the hemispherical shell blank 1 is to be subjected to the turning operation continuously without any interference of the cutting tool 139 with the thick metal fitting 6.

Also, the working by the working apparatus using said fluid controlled tool rest is not limitted to the turning operation of the inner radius spherical surface of spherical shell, but is to be similarly applied to the turning operation of the outer diameter and further sufficiently to that of planes.

As detailed above with reference to the embodiment shown in the drawings in the working apparatus using said fluid controlled tool rest, the fluid cylinder and cutting tool of the fluid controlled tool rest is to be displaced in a predetermined direction while applying the turning operation to the working surface when the products have projections on the way of the surface of turning operation even if the products is shaped suitably for the turning operation, so that the working time is substantially shortened and cost is reduced.

What is claimed is:

1. A profile surfacing apparatus for working a peripheral wall of a hemispherical shell comprising a boring machine having a boring head (31) with a main spindle (33), and apparatus body (A) mounted on said boring head for receiving said main spindle, a rotary flange (50) rotatably supported on said apparatus body and connected to said main spindle for receiving a rotary drive force of said main spindle, said rotary flange having a rotation axis, a rotary arm (60) provided on an end of said rotary flange and having a slide guide portion (60a, 60b) extending in a direction perpendicular to the rotation axis of said rotary flange, a template (92) fixed to said rotary arm and extending along said slide guide portion, a slide head (78) slidable along said slide guide portion of said rotary arm, a cutting tool holder (84) provided with a cutting tool (85) and mounted on said slide head for movement parallel to the rotation axis of said rotary flange in cutting and feeding directions, and a profiling unit engaged with said template and connected to said tool for moving said cutting tool in the cutting and feeding directions along said template which is mounted on said rotary arm for profiling the semispherical shell.

2. An apparatus according to claim 1, incuding in combination with said apparatus body, a fixed mount for fixedly mounting the semispherical shell, a turntable for rotatably mounting the semispherical shell about a central axis of symmetry of this shell passing through a center of curvature of the semispherical shell, a main spindle head (103), means mounting said main spindle head for movement radially with respect to said longitudinal axis over said turntable, a tool rest (108) movably mounted to said main spindle head for movement axially with respect to the axis and said turntable, a further tool rest (102) connected to said first-mentioned tool rest, solenoid means connected to said further tool rest and carrying a working tool for movement toward and away from a semispherical surface of the semispherical sphere, a model ring fixed to said turntable and concentric about the semispherical shell, said model ring having portions with selected configurations that can activate a proximity switch, a proximity switch mounted to said means for mounting said main spindle head for movement with said main spindle head and first-mentioned tool rest for movement over a surface of said model ring, the semispherical shell having surface projections which correspond to the selected configuration of the activating portions of said model ring, said proximity switch being connected to said solenoid means for actuating said solenoid means to withdraw a working tool from the spherical surface of said semispherical shell upon the approach of a surface projection when said turntable is rotated and when said first-mentioned tool rest is moved axially with respect to said semispherical shell.

* * * * *